(12) United States Patent
Li

(10) Patent No.: US 9,428,839 B1
(45) Date of Patent: Aug. 30, 2016

(54) ELECTROLYSIS STACK DEVICE WITH ADJUSTABLE OPERATING CAPACITY

(71) Applicant: Haiming Li, Braintree, MA (US)

(72) Inventor: Haiming Li, Braintree, MA (US)

( * ) Notice: Subject to any disclaimer, the term of this patent is extended or adjusted under 35 U.S.C. 154(b) by 0 days.

(21) Appl. No.: 14/831,646

(22) Filed: Aug. 20, 2015

Related U.S. Application Data

(63) Continuation of application No. 14/800,272, filed on Jul. 15, 2015.

(51) Int. Cl.
| | | |
|---|---|---|
| *C25B 15/02* | (2006.01) | |
| *C25B 1/04* | (2006.01) | |
| *C25B 9/00* | (2006.01) | |
| *C25B 11/02* | (2006.01) | |
| *C25B 9/02* | (2006.01) | |
| *C25C 7/02* | (2006.01) | |
| *C25B 9/04* | (2006.01) | |
| *C25B 9/18* | (2006.01) | |
| *H01R 13/193* | (2006.01) | |

(52) U.S. Cl.
CPC . *C25B 9/04* (2013.01); *C25B 9/18* (2013.01); *H01R 13/193* (2013.01)

(58) Field of Classification Search
CPC .......... C25B 9/00; C25B 9/06; C25B 15/02; C25B 11/02; C25B 9/02; C25B 11/03; C25B 9/04; C25B 9/18; C25C 7/00; C25C 7/02; C25C 3/08
USPC .............................................. 204/242, 230.3
See application file for complete search history.

(56) References Cited

U.S. PATENT DOCUMENTS

| | | | | |
|---|---|---|---|---|
| 3,791,947 A | * | 2/1974 | Loftfield ................. | C25B 9/063 204/269 |
| 6,082,053 A | * | 7/2000 | Bischof ............... | E05D 15/0604 49/221 |

\* cited by examiner

*Primary Examiner* — Zulmariam Mendez

(57) ABSTRACT

A configuration for an electrolysis stack device with adjustable operating capacity, including a specially shaped polar panel, an electricity connector and a pressing connector. A connection part of the polar panel and a pressing connector ensure that the electrical current can flow smoothly from a power source, via the electricity connector, to the electrolysis stack and back to the power source. In various embodiments, a zigzag track may help an electricity connector move to the correct position to vary the operating capacity of the electrolysis stack device.

2 Claims, 3 Drawing Sheets

ELECTROLYSIS STACK DEVICE WITH ADJUSTABLE OPERATING CAPACITY

DESCRIPTION OF RELATED ART

This application is a Continuation of application Ser. No. 14/800,272, filed on Jul. 15, 2015.

Hydrogen, a highly effective clean gas with zero greenhouse gas emissions when burnt, is deemed to be the leading energy carrier in the future. One of the technologies for generating hydrogen is water electrolysis. If the power source of an electrolysis system is renewable energy (e.g., wind power or solar power) instead of traditional fossil fuel, the resultant hydrogen gas becomes truly carbon-free energy, emitting zero greenhouse gas during production and usage. Renewable energy sources such as wind and solar power, however, are generally unstable and intermittent, and are therefore hard to be fully utilized by electrolyzers in an effective way. The use of power electronics to stabilize the electricity input often leads to increased capital cost and efficiency loss, which currently prevents electrolyzers from being massively used in the clean energy industry.

Many prior-art technologies are attempting to adjust the capacity of electrolysis systems for utilizing renewable power. In general, they are focusing on improving the control system and looking at different control methods of the electrolysis stack.

For example, U.S. Pat. No. 8,889,306 describes an electrochemical cell system including a plurality of electrochemical cells arranged in an electrochemical cell stack, the stack including a plurality of substacks with a plurality of independent control devices.

U.S. Patent Application Publication No. 2011/0155583 describes a novel system and method for generating hydrogen by electrolysis of water from a renewable power source. Electricity generated by a solar panel or wind mill is measured and connected with a plurality of electrolysis stacks. The number of operating electrolysis stacks is constantly controlled by a controlling mechanism that calculates an optimal number of operating electrolysis stacks using the measured input electricity parameter and the operating parameter of an electrolysis unit.

U.S. Pat. No. 8,936,704 describes a design in which the capacity of an electrolysis stack is controlled using a step motor and a guiding rail.

SUMMARY

The present application relates generally to a hydrogen generation system, and more particularly to the structure of an electrolysis stack device with adjustable operating capacity, which may be used in a hydrogen generator with unstable power input, e.g., from wind or solar energy sources. In various embodiments, the electrolysis stack device includes an electrically conductive (e.g., copper) bar, an electrolysis stack including a number of electrolysis polar panels (also called electrode panels), an electricity connector, and a pressing connector.

During operation of the device, the electricity connector and pressing connector generally move to different positions with the help of a moving device, whereas the electrically conductive bar and the electrolysis stack remain still. Each polar panel includes a connector part configured to connect with the electricity connector; this facilitates variably including any number of panels in the electric circuit. The pressing connector is configured to press on the electricity connector, to ensure a smooth electricity connection between the electricity connector and the connector part on the polar panel. Beneficially, the disclosed structure of the electrolysis stack device provides an effective way to avoid friction during the capacity adjustment, secure the connection of the electric circuit and extend the lifetime of the moving parts.

BRIEF DESCRIPTION OF THE DRAWINGS

Various embodiments will be described with respect to the following accompanying drawings.

DETAILED DESCRIPTION OF EXAMPLE EMBODIMENTS

The present application discloses a special structural configuration of an electrolysis stack that enables adjusting the operation capacity of the electrolysis stack while ensuring the quality of the electricity connection.

Embodiments of the electrolysis stack and various components thereof are described herein in detail. It is to be understood, however, that features described with reference to one or more embodiments need not, in general, be present in all embodiments. Accordingly, the described example embodiments are to be considered illustrative and not limiting.

For simplicity and clarity of illustration, the accompanying figures illustrate the general manner of construction, and description and details of well-known features and techniques may be omitted to avoid unnecessarily obscuring the invention. Additionally, elements in the figures are not necessarily drawn to scale; some areas or elements may be expanded to help improve understanding of embodiments of the invention.

The terms "first," "second," "third," "fourth," and the like in the description and the claims, if any, may be used for distinguishing between similar elements and not necessarily for describing a particular sequential or chronological order. It is to be understood that the terms so used are interchangeable. Furthermore, the terms "comprise," "include," "have," and any variations thereof, are intended to cover non-exclusive inclusions, such that a process, method, article, apparatus, or composition that comprises a list of elements is not necessarily limited to those elements, but may include other elements not expressly listed or inherent to such process, method, article, apparatus, or composition.

It is contemplated and intended that the configuration disclosed herein apply to the structure of an electrolysis stack which can adjust its capacity to different types of electricity input; for the sake of clarity, the examples provided herein refer to either solar power or wind-generated power. Furthermore, it is contemplated and intended that the systems and methods disclosed herein may be used in combination with any type of electrolysis technology. Technologies for hydrogen generation through water electrolysis currently available and well-known to those of ordinary skill in the art include proton exchange membrane (PEM) technology and alkaline technology. PEM electrolysis is the electrolysis of water in a cell equipped with a solid polymer electrolyte (SPE) that is responsible for the conduction of protons, separation of product gases, and electrical insulation of the electrodes. Alkaline electrolysis uses alkaline as the electrolyte. As will be readily appreciated, however, the embodiments described herein are not limited to these two electrolysis technologies, but are amenable to use in conjunction with other electrolysis technologies as well, and a person of ordinary skill in the art will know the necessary modifications and changes to be made.

Figure 1:
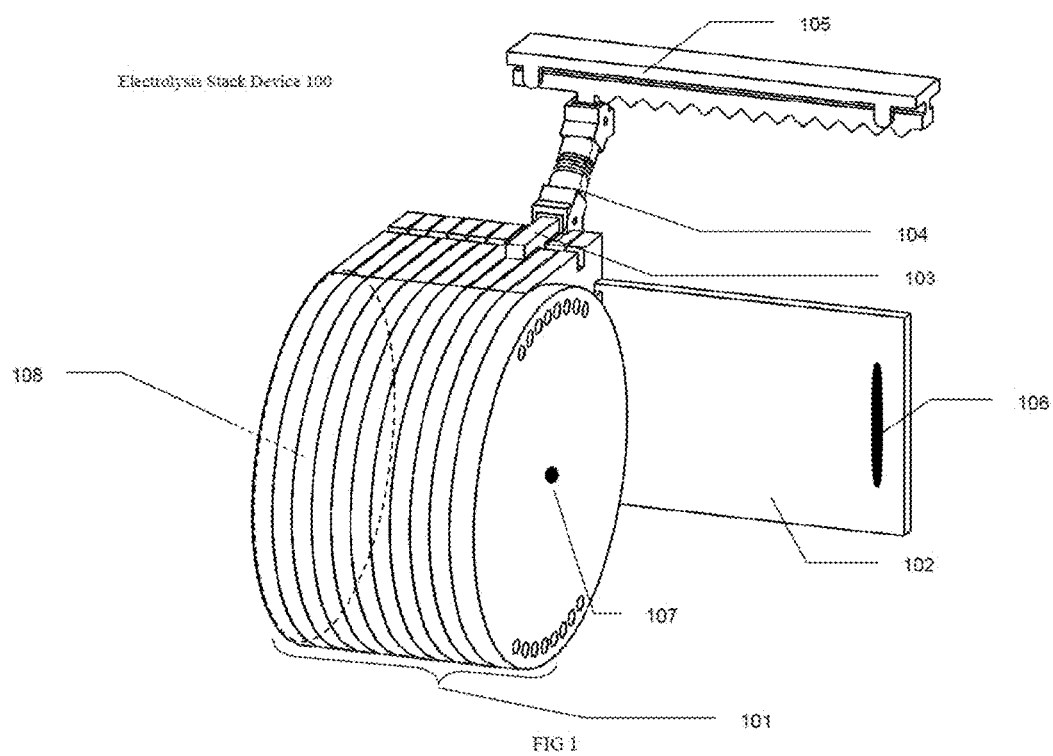
FIG. 1 is a perspective view of an example structure of an electrolysis stack with adjustable operating capacity, in accordance with one embodiment.

In FIG. 1, an example configuration of an electrolysis stack device 100 with adjustable operating capacity is shown. The design includes an electrolysis stack 101, a copper bar 102 (or a bar made from another electrically conductive material, which need not have the exact shape as depicted), an electricity connector 103, a pressing connector 104, and a guiderail 105. An electrical connection point 106, which is at one end of the copper bar 102, is electrically connected to one terminal of a DC power source (not shown). At another point along the copper bar 102 (which may, but need not be, near the other end), the copper bar 102 is electrically connected, via the electricity connector 103, to one of the panels (shown in more detail in FIG. 2) of the electrolysis stack 101. The other terminal of the DC power source is electrically connected with electrical connection point 107, which is located at one end of the electrolysis stack 101. The other end terminal 108 of electrolysis stack 101 is connection-free. Thus, a portion of the stack 101 forms a closed circuit with the DC power source. In this way, electric current will go into electrical connection point 106, through the copper bar 102, the electricity connector 103, part of the electrolysis stack 101, and come out from the electrical connection point 107, finally back to the DC power source. (In real operation, the positive and negative terminals of the DC power can be switched without affecting the operation.) The electricity connector 103 is movable relative to the electrolysis stack, allowing the number of electrolysis panels that form part of the circuit (i.e., the number of electrolysis panels located between the panel-connection point of the electricity connector 103 and the electrical connection point 107 at the end of the stack) to be adjusted. As illustrated, the copper bar 102 may be rectangular in shape; however, other shapes are also possible. For example, the copper bar 102 may be formed collectively by multiple cables (e.g., placed adjacent and oriented in parallel to one another). The copper bar is generally configured to accommodate (e.g., by virtue of a large width perpendicular to the direction of current flow) the high current that is to flow through the electrical circuit.

Figure 2:
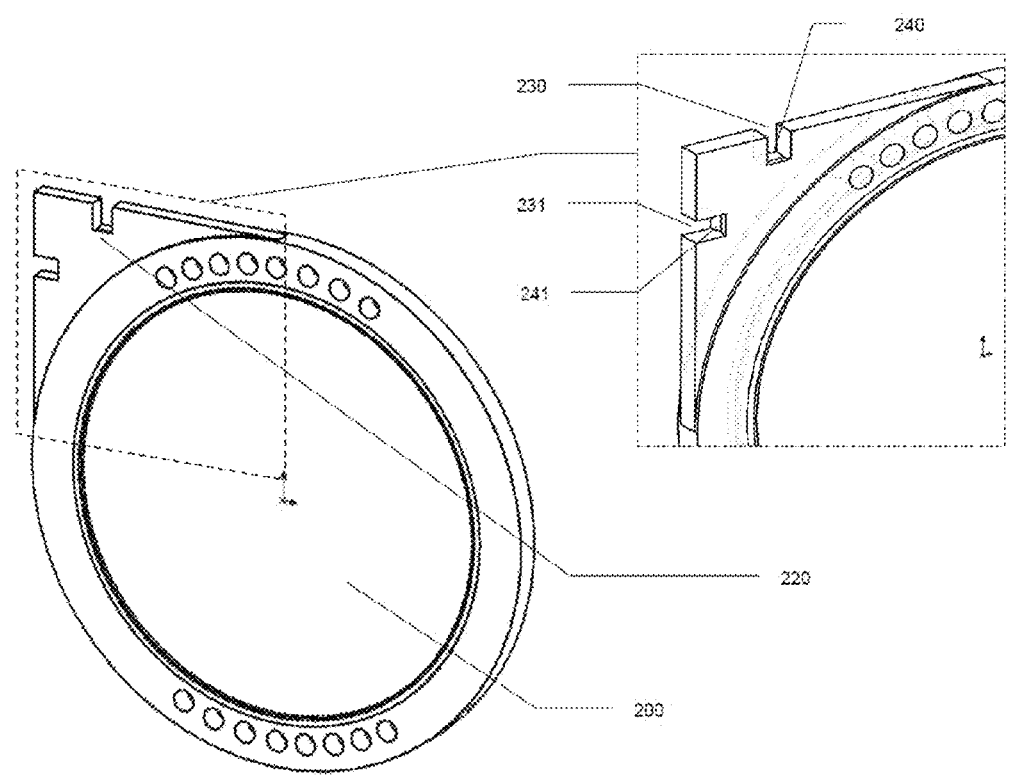
FIG. 2 is a perspective view of the structural configuration of a polar panel in the electrolysis stack, in accordance with one embodiment.

FIG. 2 provides a side view of an individual one of the specially configured polar panels 200 (also called electrode panels sometimes) constituting the electrolysis stack 101. In general, multiple (e.g., two or more) of these polar panels 200, in some occasions together with a plurality of regular shaped panels (circular or rectangle), compose the electrolysis stack 101 of the device 100. Due to the shape of regular panels (circular or rectangle panels in different cases), these panels are usually not adapted to be connected tightly with an external wire or other electrically conductive part. The polar panel 200 described herein, by contrast, may be specially configured to include a connection part 220, affixed to an otherwise circular panel, that provides for a good electrical connection. The shape of the connection part 220 may, for example, be triangular, as shown in FIG. 2. However, other shapes may also be used for the connection part 220. No matter what is the shape of the connection part 220, it generally enables an accurate connection between electrolysis stack 101 and electricity connector 103, meanwhile ensuring the electrical circuit. In some embodiments, the connection part 220 is made thinner than the circular portion of the polar panel 200 so as to ensure that the electricity connector 103 only connects with one polar panel 200 at a time and keeps a distance to the connection parts 220 of other panels (shown in FIGS. 1 and 3). In some embodiments, the connection part 220 includes two grooves 230, 231 to secure the moving path of the electricity connector 103. The grooves 230, 231 may be oriented perpendicular to one another, and their bottom surfaces 240, 241 may have a V-shape (as shown in FIG. 2), a U-shape, or some other shape suitable to achieve easy movement of the electricity connector 103 on the electrolysis stack 101 (shown in FIGS. 1 and 3).

Figure 3:
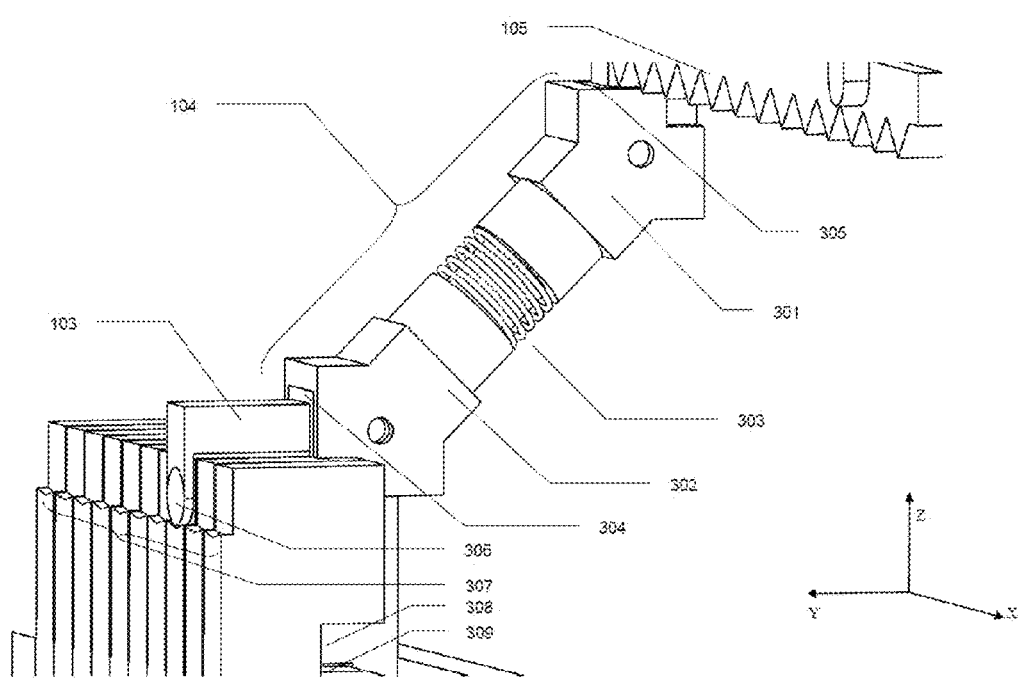
FIG. 3 is a perspective view of the pressing connector in the electrolysis system, in accordance with one embodiment.

FIG. 3 illustrates the connection type for electrolysis stack 101, electricity connector 103, pressing connector 104 and guiderail 105. The function of the pressing connector 104 is to keep the electricity connection between electrolysis stack 101 and electricity connector 103 tight and smooth. The pressing connector 104 may contain standard triangle connection parts 301, 302 (or, alternatively, non-triangular connection parts), compressible part 303 and insulating mats 304, 305. Insulating mats 304, 305 are used to insulate pressing connector 104 and guiderail 105 from the electric circuit (DC in electrolysis stack 101). The pressing connector 104 provides a mechanical connection between guiderail 105 and electricity connector 103 that applies a positive (compression) stress on the electricity connector 103. The compression part 303 may transfer an externally-applied force onto the electricity connector 103, or may include a spring device (or a different device of similar function) that by itself generates the compression force exerted on the electricity connector 103. The guiderail 105 may be movable in a direction parallel to the longitudinal axis of the electrolysis stack (i.e., in the X-direction in FIG. 3), but fixed in the other dimensions (i.e., the Y- and Z-directions in FIG. 3). The grooves 230 in the connection parts 220 of polar panels 200 are aligned to form a continuous groove across the connection parts 220, and their V-shaped bottom surfaces 240 collectively form zigzag track 307. Similarly, another zigzag track 309 is formed by the V-shaped bottom surfaces 241 of the grooves 231 in the other side of the connection parts 220 of the polar panels 200. The electricity connector 103, shown in FIG. 3 in a cut-away view, may include two wheels 306, 308 (having a width fitting within the grooves) that move across the zigzag tracks 307 and 309 on the electrolysis stack 101. In general, electricity connector 103, pressing connector 104 and guiderail 105 form a fixed structure, and can be moved together along the electrolysis stack, in the X-direction in FIG. 3.

In some embodiments, before the system starts, the electricity connector 103 may be located at the far end terminal 108 of electrolysis stack 101 (opposite the terminal end with electricity joint 107), which results in a full-capacity electrolysis stack 101. During operation, the electricity connector 103 may be operated in different positions under different voltages or currents. When adjusting the operating capacity of the stack, the electricity connector 103 moves along a path defined by the zigzag tracks 307/309. The position for electricity connector 103 is fully matched with one of the polar panels, for example, electricity connector 103 may connect with the third polar panel, as shown in FIG. 3. When the system is shut down, electricity connector 103 generally moves back to its original position, i.e., to the end terminal 108 of the electrolysis stack 101. Depending on the condition of the power source, an electrolysis stack 101 may include both polar panels 200 and regular panels (circular or rectangle) that do not have a connection part 220. In accordance with some embodiments, however, an electrolysis stack 101 that includes only polar panels 200 (i.e., panels all containing a connection part 220) may be used in order to get a higher level of adjustment capacity.

As will be recognized by those skilled in the art, the innovative concepts described in the present application can be modified and varied over a large range of applications. Accordingly, the scope of the claimed subject matter shall not be taken as limited by any of the specific example embodiments described. It will be appreciated that various alternatives modifications and variations are possible without departing from the scope of the present disclosure.

Further, none of the description in the present application should be read as implying that any particular element, step or function is an essential element which must be included in the claim scope. Moreover, none of the claims are intended to invoke paragraph six of 35 USC section 112 unless the exact words "means for" are followed by a participle.

What is claimed is:

1. An electrolysis stack device with adjustable operating capacity, the device comprising:

an electrolysis stack comprising a plurality of polar panels connectable, at a first end, to a first terminal of a power source;

an electrically conductive bar connected to a second terminal of the power source;

an electricity connector electrically connecting the electrically conductive bar to a variably selected polar panel of the electrolysis stack; and a pressing connector configured to exert a force on the electricity connector so as to maintain a good electric connection between the electricity connector and the selected polar panel of the electrolysis stack, wherein at least two of the polar panels comprise a connection part for electrically connecting the respective polar panel to the electricity connector, each of the connection parts comprising two or more grooves for securing movement of the electricity connector therein, the grooves forming a zigzag track for movement of the electricity connector thereacross.

2. The device of claim 1, wherein the pressing connector comprises an insulating mat electrically insulating the pressing connector from the electricity connector.

* * * * *